United States Patent [19]
Bryan

[11] 3,792,468
[45] Feb. 12, 1974

[54] VEHICLE EXIT SIGNALING SYSTEM
[76] Inventor: Horace V. A. Bryan, 2836 W. 33rd St., Brooklyn, N.Y. 11224
[22] Filed: Aug. 31, 1972
[21] Appl. No.: 285,359

[52] U.S. Cl............... 340/326, 340/52 R, 340/274, 340/327, 340/371
[51] Int. Cl. .......................................... G08b 27/00
[58] Field of Search . 340/326, 327, 371, 52 R, 274; 315/84

[56] References Cited
UNITED STATES PATENTS
| 492,627 | 2/1893 | Kinter | 340/52 R |
| 1,086,527 | 2/1914 | Hamilton et al. | 340/327 |
| 901,540 | 10/1908 | Lindsey | 340/274 |
| 3,648,273 | 3/1972 | Gardner | 340/326 |

Primary Examiner—Donald J. Yusko
Assistant Examiner—Robert J. Mooney
Attorney, Agent, or Firm—Clarence A. O'Brien; Harvey B. Jacobson

[57] ABSTRACT

A vehicle exit signaling system comprising audio signal means for actuation by vehicle passengers to initially signal the vehicle driver that the passenger wishes to disembark, visual signal means for reminding the driver to dispatch the passenger subsequent to operation of the audio signal means, and means responsive to operation of the vehicle exit doors for disabling the visual signal means as the passenger disembarks.

8 Claims, 4 Drawing Figures

VEHICLE EXIT SIGNALING SYSTEM

The present invention is generally related to vehicle signaling systems and, more particularly, to a signaling system for use with mass transit vehicles to initially inform and subsequently remind the driver that a passenger wishes to disembark.

In the past, transit vehicles have been provided with various signaling systems to inform the drivers when to stop for the purpose of discharging passengers. Such basic systems included the use of mechanical bells which were manually actuated by the passengers through pull cords or the like. Later, the systems were enchanced through the use of electrical bells or buzzers which were easier to operate and provided a signal of sufficient intensity to be heard even over the noisest crowd of passengers. While such systems have taken passenger comfort and convenient into consideration, the drivers' interests, for the most part, have been ignored. Buzzers and bells intended to inform drivers when to stop have become a source of constant annoyance, particularly on large crowded buses. Often, passengers have the tendency to pull the stop cord more than once out of concern that the driver may forget to stop. This, to say the least, can be most bothersome to drivers who are expected to handle their vehicles with a high degree of safety and maintain predetermined time schedules. Therefore, it is an object of the present invention to provide an improved vehicle exit signaling system which may be conveniently operated by passengers wishing to disembark without undue distraction to the vehicle driver.

Another object of the present invention is to provide a novel vehicle exit signaling system including visual signal means for reminding the driver subsequent to an audio signal that a passenger wishes to disembark.

It is a further object of the present invention to provide a unique vehicle exit signaling system including visual signal means which are automatically disabled by operation of vehicle exit doors upon operation to discharge passengers.

Still a further object of the present invention is to provide a versatile vehicle exit signaling system including audio signal means adapted to be actuated by passengers wishing to disembark and being disenabled subsequent to initial operation until the vehicle exit doors have been operated.

It is a further object of the present invention to provide a unique vehicle exit signaling system which automatically performs a plurality of signaling functions, is of relatively simple construction, and is economical to manufacture and install in existing mass transit vehicles.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
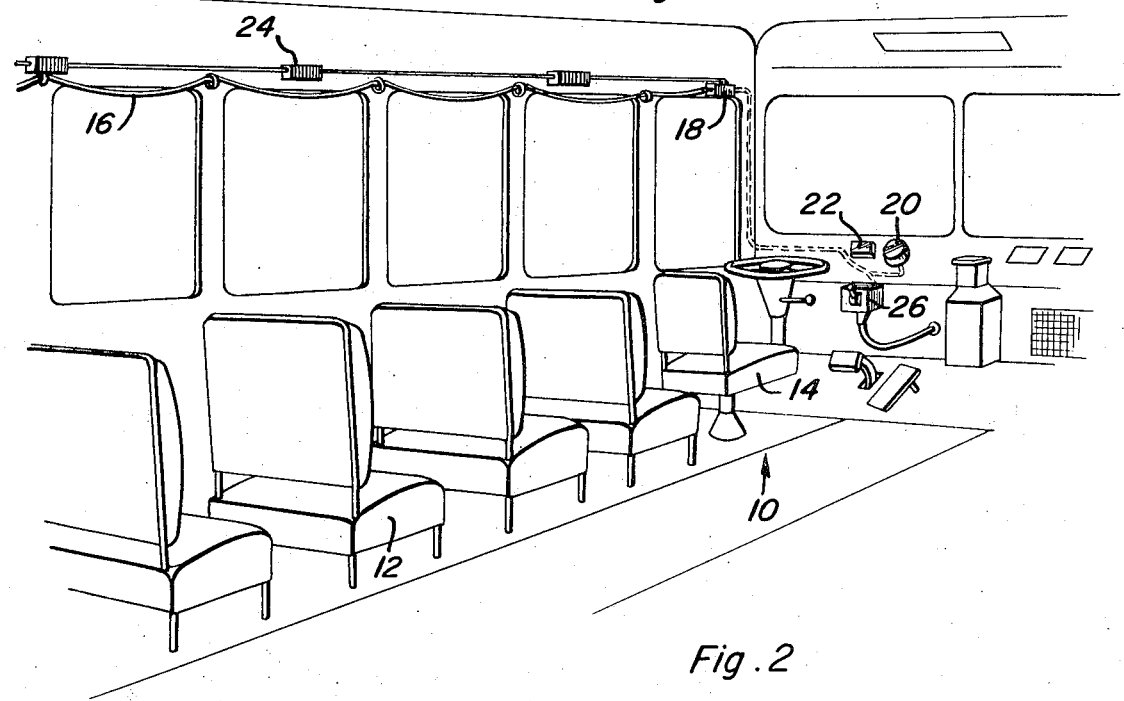
FIG. 1 is a perspective view of the interior of a typical mass transit vehicle with the exit signaling system of the present invention installed therein.

Referring now, more particularly, to FIG. 1 of the drawings, the interior of a typical mass transit vehicle is generally indicated by the numeral 10 and includes a plurality of passenger seats 12 and a driver's seat 14. The signaling system of the present invention is provided with a pull cord 16, or similar means mounted adjacent to the passenger seats in a conventional manner and connected to a switch 18 for operation thereof. Actuation of the pull cord effects operation of an audio signaling or audible alerting means, preferably including a bell or buzzer 20 mounted adjacent the driver's seat. In addition, visual signaling or alerting means are provided including a light 22 mounted adjacent the driver's seat and remote signaling lights 24 positioned along the length of pull cord 16. A conventional door control switch 26 is also mounted near the driver's seat for convenient operation of the vehicle exit doors in a conventional manner for entry and exit of passengers.

Figure 2:
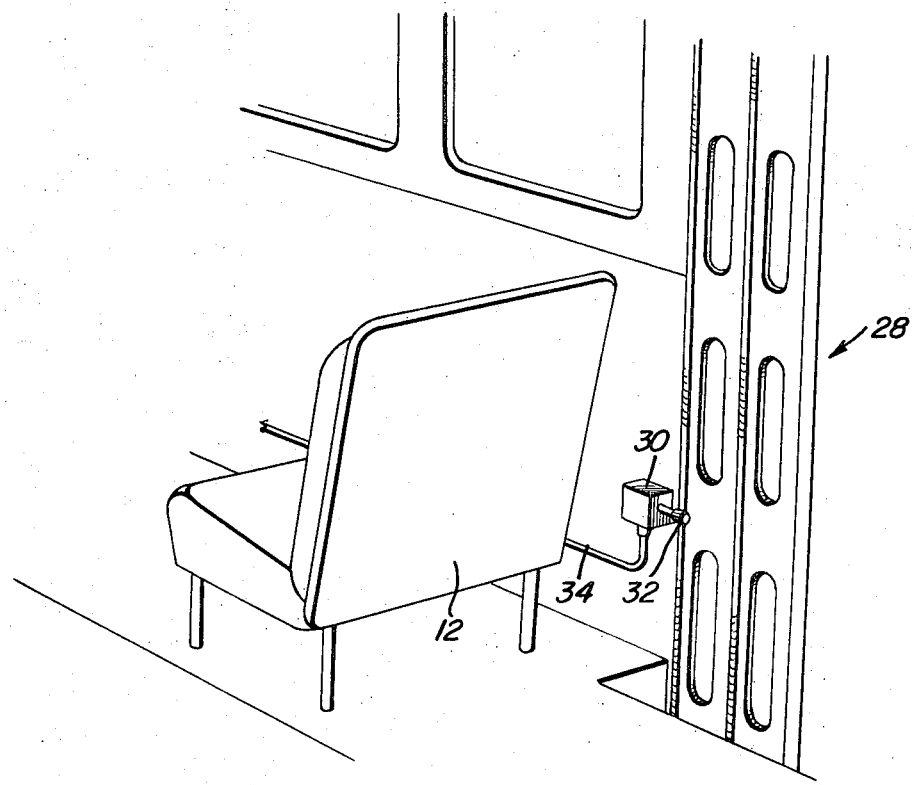
FIG. 2 is a perspective view of a typical door operation responsive switch associated with the system of the present invention.

With reference to FIG. 2, it will be observed that in a first embodiment of the invention, the vehicle is provided with a switch 30 mounted adjacent to passenger exit doors, such as that generally indicated by the numeral 28. Switch 30 is provided with an actuator 32 which is engaged by a portion of the exit door upon opening. The switch is connected to the circuitry of the signaling system by way of line 34. The circuitry is such that upon operation of the exit doors, the visual signaling means is automatically disabled and remains so until a subsequent operation of the pull cord switch. In addition, the circuitry includes means for disenabling the pull cord switch subsequent to the initial operation, whereby the audio signal means cannot be operated more than once for each bus stop, as hereinafter explained. This arrangement provides an initial audio signal to the driver that a passenger wishes to disembark, followed by visual signals which serve as a reminder to discharge the passenger at the next route stop. In the event that a passenger actuates the pull cord switch subsequent to the initial actuation, the audio signal means will not be energized. This assures that the driver will not be unnecessarily distracted and permits him to concentrate more fully upon his driving duties. In this respect, the signaling system of the present invention enhances the safety of the vehicle operation.

Figure 3:
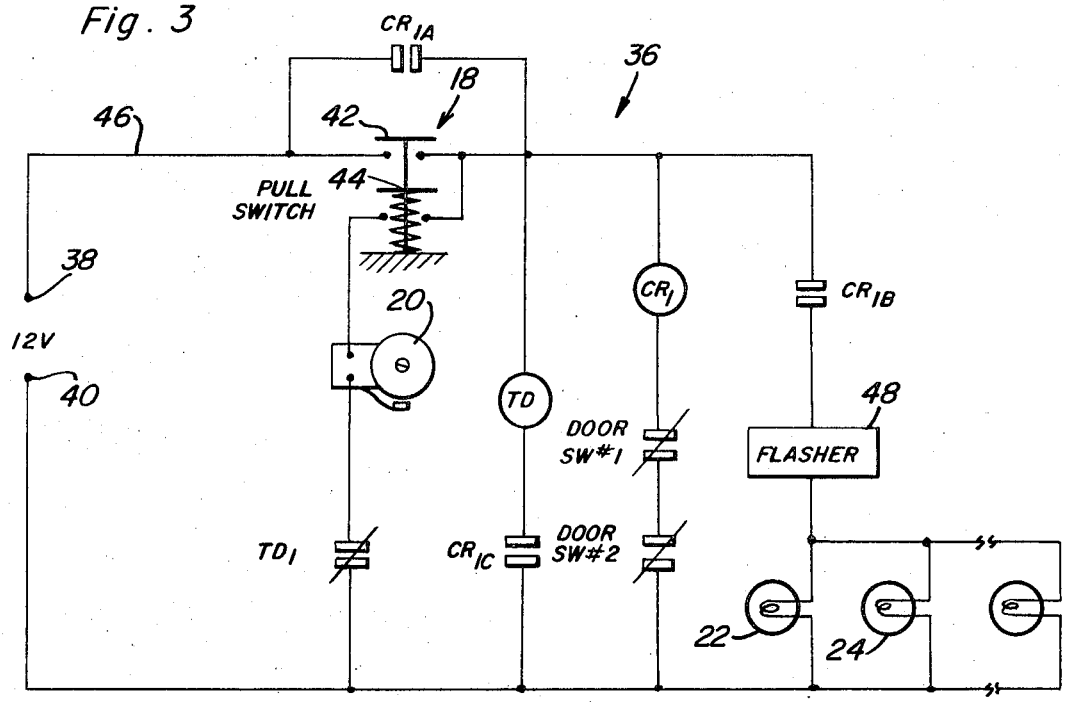
FIG. 3 is a schematic diagram of a first embodiment of the circuitry of the present invention.

Referring now to FIG. 3 of the drawings, the first embodiment of the circuitry associated with the vehicle exit signaling system of the present invention is generally indicated by the numeral 36 and is provided with input terminals 38 and 40 adapted to be connected to the associated vehicle power supply, such as 12 V.D.C. Preferably, pull switch 18 includes at least two normally open momentary contacts 42 and 44 connected to input terminal 38 by way of line 46. The bell 20, or similar audio signaling means, is serially connected to contacts 44 of the pull cord switch and to normally closed contacts $TD_1$. Closure of the pull cord switch is effective to energize bell 20 so long as contacts $TD_1$ remain closed.

A self-latching control relay $CR_1$ is connected in parallel with the bell circuit and includes a pair of normally opened relay holding contacts $CR_{1a}$ bridging contacts 42 of the pull cord switch. Control relay $CR_1$ is serially connected to a pair of door switches including normally closed contacts. It will be appreciated that actuation of the pull cord switch will be effective to energize the control relay, which remains in the circuit after release of the pull cord by way of the relay holding contacts $CR_{1a}$.

The visual signaling means associated with the present invention includes electrical lamps 22 and 24 connected in parallel with each other and serially to a conventional flasher circuit 48 and a pair of normally opened relay control contacts $CR_{1b}$. The signal lights will not be energized unless control relay $CR_1$ is energized to effect closure of contacts $CR_{1b}$. Of course, it is not intended that the system of the present invention be limited to the use of electrical lights or lamps, other visual display means may be utilized, if desired.

The system illustrated in FIG. 3 is provided with means for disenabling the audio signal means subsequent to initial operation of the pull switch. Preferably, this is achieved by a time delay circuit including a time delay relay TD in parallel with the bell circuit and serially connected to normally opened timer control relay contacts $CR_{1c}$. The time delay relay is of the "on delay" type, such that operation of the associated contacts will not be effected until completion of a preselected time interval.

Operation of the circuitry illustrated in FIG. 3 may be described as follows. With both vehicle exit doors closed, and the associated switch contacts in the closed position, initial actuation of the pull cord switch will effect energization of bell 20 and control relay $CR_1$. In addition, this actuation will initiate operation of the time delay relay TD. Preferably, the "on" time delay is set for a relatively short time interval of 1-2 seconds. Upon completion of this time interval, contacts $TD_1$ are automatically opened, whereby the bell circuit is disenabled to prevent subsequent operation until the time delay relay is reset. Initial energization of the control relay $CR_1$ effectively removes the pull switch from the circuitry by way of interlock contacts $CR_{1a}$. In addition, energization of the control relay effects closure of contacts $CR_{1b}$, which, in turn, effects energization of flasher 48 and visual signal lamps 22 and 24. The control relay remains energized and the lamps continue to flash until the vehicle exit doors have been opened to effect opening of at least one of the associated door switches No. 1 or No. 2 which are serially connected to the control relay. De-energization of the control relay causes opening of contacts $CR_{1c}$ which de-energize the time delay relay and return the associated contacts $TD_1$ to their normally closed position and reset the bell circuit for subsequent operation.

Figure 4:
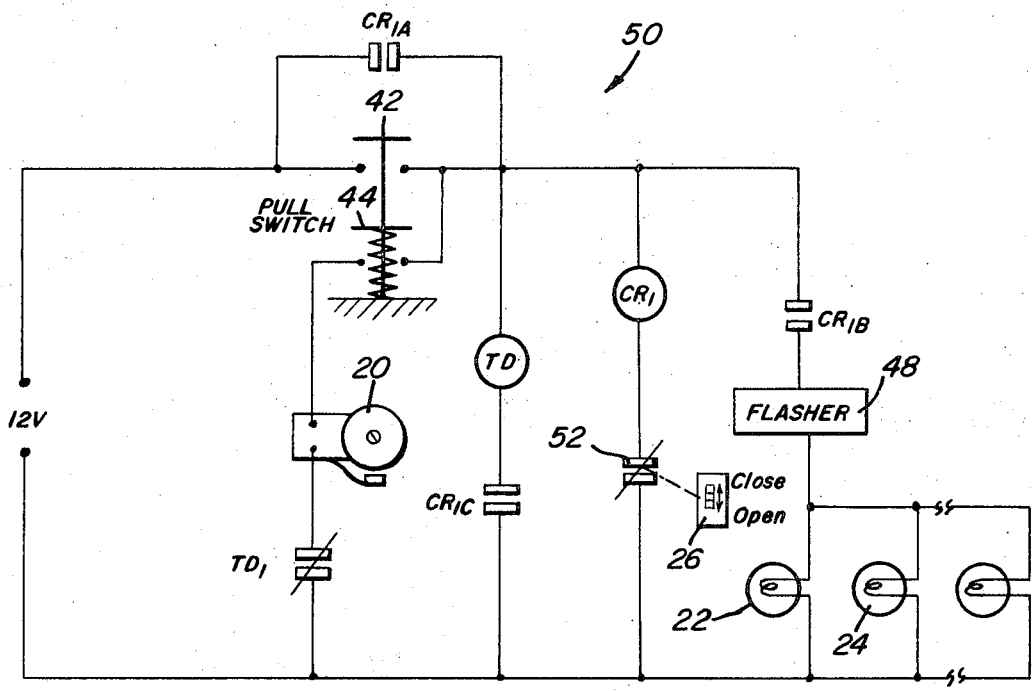
FIG. 4 is a schematic diagram of a second embodiment of the circuitry of the present invention.

With reference to FIG. 4 of the drawings, a second embodiment of the circuitry associated with the present invention is generally indicated by the numeral 50. Operation of this circuitry is substantially the same as that explained above, but does not require the use of switches mounted adjacent the vehicle exit doors. Instead, the circuitry of FIG. 4 includes a pair of normally closed contacts 52 which are ganged to door control circuit switch 26. Contacts 52 remain closed when the door control switch is in the closed position. Operation of the door control switch by the driver to the open position is effective to open contacts 52, whereby control relay $CR_1$ is de-energized to reset the circuit in a manner described above.

From the foregoing description, it will be appreciated that the vehicle exit signaling system of the present invention is of relatively simple construction, yet provides a plurality of versatile signaling functions which allow minimum distraction to the vehicle operator to permit him to more fully concentrate upon his driving duties. In addition, since the signaling system is automatically de-energized and reset by operation of the vehicle exit doors, it does not require additional attention of the vehicle driver. Automatic disenablement of the audio signal means subsequent to initial operation of the pull switch prevents unnecessary distractions to the driver by repeated passenger operation of the pull switch.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A vehicle exit signaling system comprising:
   a. manual actuator means;
   b. audio signal means responsive to momentary actuation of said manual actuator means for producing audio signals in the vehicle indicative of a passenger's desire to disembark;
   c. visual signal means enabled by operation of said manual actuator means for continuously providing visual signals; and
   d. circuit means responsive to said momentary actuation of said manual actuator means for disenabling said audio signal means subsequent to said momentary actuation of the manual actuator means.

2. The system set forth in claim 1 wherein said means for disenabling said audio signal means maintains operation of said visual signal means.

3. The system set forth in claim 2 together with reset means for selectively disabling said circuit means to enable said audio signal means for subsequent operation by of said manual actuator means.

4. The system set forth in claim 3 wherein said reset means for selectively disabling said circuit means is responsive to operation of a vehicle exit door.

5. The combination of claim 1 wherein said circuit means includes timing means for maintaining the audio signal means in operation for a predetermined interval of time following said momentary actuation of the manual actuator means.

6. In combination with a source of electrical energy and a signalling system having audible and visual alerting devices simultaneously energized by said source upon momentary actuation of a signalling switch, means for controlling operation of said alerting devices, comprising self-latching relay means connected to said source by the signalling switch for energization simultaneously with the audible alerting device in response to said momentary actuation of the switch, timing means responsive to energization of the relay means for initiating a timing cycle of predetermined duration, means responsive to termination of said timing cycle for disabling the audible alerting device, means connecting the visual alerting device to the relay means in by-pass relation to the timing means for continuous operation while the relay means is energized, and reset means connected to the relay means for deenergization thereof to disable the visual alerting means and recondition the audible device for operation.

7. The combination of claim 6 wherein said relay means includes a relay coil connected to the source in series with the signalling switch and the reset means, a relay holding switch connecting the source to the relay coil in by-pass relation to the signalling switch, a relay control switch connecting the visual alerting device to the source in series with said relay holding switch, and a timer control switch connected in series with the timing means.

8. The combination of claim 7 wherein said timing means includes a time delay relay connected in series with the signalling switch and the timer control switch to said source and having normally closed contacts connected in series with the audible alerting device to the source.

* * * * *